(12) United States Patent
Liu et al.

(10) Patent No.: US 12,484,220 B2
(45) Date of Patent: Nov. 25, 2025

(54) THREE-DIMENSIONAL MEMORY AND FABRICATION METHOD THEREOF

(71) Applicant: YANGTZE MEMORY TECHNOLOGIES CO., LTD., Wuhan (CN)

(72) Inventors: Simin Liu, Wuhan (CN); Zongliang Huo, Wuhan (CN); Wei Xu, Wuhan (CN); Bo Xu, Wuhan (CN); Yali Guo, Wuhan (CN); Bin Chen, Wuhan (CN); Siliu Zhang, Wuhan (CN); Jie Su, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 446 days.

(21) Appl. No.: 18/090,396

(22) Filed: Dec. 28, 2022

(65) Prior Publication Data

US 2023/0142381 A1    May 11, 2023

Related U.S. Application Data

(63) Continuation of application No. PCT/CN2021/029810, filed on Nov. 10, 2021.

(51) Int. Cl.
*H10B 43/27*  (2023.01)
(52) U.S. Cl.
CPC .................. *H10B 43/27* (2023.02)

(58) Field of Classification Search
CPC ........... H10B 43/00–50; G11C 16/0466–0475; G11C 27/005; G11C 11/5671; H01L 21/28587–28593; H01L 23/49838–49844; H10D 64/20–529
See application file for complete search history.

(56) References Cited

U.S. PATENT DOCUMENTS

| 2017/0025350 A1* | 1/2017 | Ito ........................ H10D 64/518 |
| 2019/0393237 A1* | 12/2019 | Choi ..................... H01L 23/367 |

FOREIGN PATENT DOCUMENTS

| CN | 112071856 A | 12/2020 |
| CN | 112331665 A | 2/2021 |
| CN | 112466886 A | 3/2021 |
| CN | 112466890 A | 3/2021 |

* cited by examiner

*Primary Examiner* — Matthew C Landau
*Assistant Examiner* — Nora T. Nix
(74) *Attorney, Agent, or Firm* — BAYES PLLC (57) ABSTRACT

The present disclosure discloses a three-dimensional memory and a fabrication method thereof. The fabrication method comprises: forming a stack structure comprising alternately stacked dielectric layers and sacrificial layers; forming a gate line slit penetrating vertically penetrating the stack structure and extending in a first horizontal direction; and etching portions of the dielectric layers and the sacrificial layers adjacent to the gate line slit to form a plurality of recesses, wherein an aperture of each recess in a vertical direction is greater than a thickness of a corresponding sacrificial layer.

20 Claims, 6 Drawing Sheets

THREE-DIMENSIONAL MEMORY AND FABRICATION METHOD THEREOF

CROSS-REFERENCE TO RELATED APPLICATIONS

This application is a continuation of International Application No. PCT/CN2021/129810, filed on Nov. 10, 2021, which is incorporated herein by reference in its entirety.

TECHNICAL FIELD

The present disclosure relates to the field of semiconductor design and manufacturing, and more particularly, to a three-dimensional (3D) memory and a fabrication method thereof.

BACKGROUND

With the development of the three-dimensional memory, the demand for the storage capacity of the memory becomes higher and higher, so that it is necessary to dispose more stacked layers on a substrate. Due to the complexity of the fabrication process of the three-dimensional memory, the more stacked layers of the three-dimensional memory result in the greater total thickness of the stacked layers, which further results in the increased difficulty of etching a gate line slit (GLS).

SUMMARY

The fabrication method of the three-dimensional memory provided according to one aspect of the present disclosure may comprise: forming a stack structure including alternately stacked dielectric layers and sacrificial layers on a substrate; forming a gate line slit penetrating through the stack structure; and etching a part of the dielectric layers and the sacrificial layers that is close to the gate line slit via the gate line slit to form a recess, wherein a bottom of the recess is located in the sacrificial layer, and a minimum value of a dimension of the recess is greater than or equal to a dimension of the corresponding sacrificial layer in a direction perpendicular to the substrate.

In one implementation of the present disclosure, the recess has a tapered dimension in a direction away from the gate line slit.

In one implementation of the present disclosure, the etching a part of the dielectric layers and the sacrificial layers that is close to the gate line slit via the gate line slit to form a recess may include: performing isotropic etching on the dielectric layers and the sacrificial layers simultaneously to form the recess and enlarge the dimension of the gate line slit, wherein an etching rate of the sacrificial layers is greater than that of the dielectric layers.

In one implementation of the present disclosure, the etching a part of the dielectric layers and the sacrificial layers that is close to the gate line slit via the gate line slit to form a recess may include: etching a part of the sacrificial layers to form an initial recess; and performing isotropic etching on the dielectric layers to enlarge the dimension of the gate line slit and enlarge the initial recess into the recess.

In one implementation of the present disclosure, a ratio of the etching rate of the sacrificial layers to the etching rate of the dielectric layers may be n:1, wherein $6 \leq n \leq 100$.

In one implementation of the present disclosure, the isotropic etching may include wet etching and/or gas etching.

In one implementation of the present disclosure, etching liquid for the wet etching may include hydrofluoric acid, wherein temperature of the hydrofluoric acid may be 10 to 70 degrees Celsius.

In one implementation of the present disclosure, time of the etching may not exceed 30 minutes.

In one implementation of the present disclosure, the method may further comprise: removing the remaining of the sacrificial layers to form a gate gap; and filling a conductive material within the gate gap to form a gate layer.

In one implementation of the present disclosure, the filling a conductive material within the gate gap to form a gate layer may include: forming the conductive layer in the gate gap, in the recess, and on a sidewall of the gate line slit via the gate line slit; and removing the conductive layer in the gate line slit and the recess.

In one implementation of the present disclosure, a material of the conductive layer may include tungsten.

In one implementation of the present disclosure, prior to forming the conductive layer, the method may further comprise: forming an insulating layer on a sidewall of the gate line slit and inner walls of the recess and the gate gap.

In one implementation of the present disclosure, prior to forming a gate line slit penetrating through the stack structure, the method may further comprise: forming a channel hole penetrating through the stack structure and extending to the substrate; and forming a functional layer and a channel layer sequentially on an inner wall of the channel hole, and filling an insulating material in the channel hole to form a channel structure.

In another aspect, the present disclosure provides a three-dimensional memory which may comprise: a substrate; a stack structure on the substrate and including alternately stacked dielectric layers and gate layers; and a gate line slit structure including a central portion penetrating through the stack structure and a plurality of protruding portions protruding laterally outward from the central portion, a protruding end of the protruding portion being in contact with the gate layer, and a minimum value of a dimension of the protruding portion being greater than or equal to a dimension of the corresponding gate layer.

In one implementation of the present disclosure, the protruding portion has a tapered dimension in a direction away from the central portion.

In one implementation of the present disclosure, the three-dimensional memory may further comprise an insulating layer on a part of an outer sidewall of the gate line slit structure and on an inner wall of the gate gap.

In one implementation of the present disclosure, the three-dimensional memory structure may further comprise a channel structure, wherein the channel structure penetrates through the stack structure and includes an insulating material, a channel layer and a functional layer sequentially from inside to outside.

According to the three-dimensional memory and the fabrication method thereof of the implementations of the present disclosure, a recess is formed so that the minimum value of the dimension of the recess is greater than or equal to the dimension of the corresponding sacrificial layer in a direction perpendicular to the substrate by enlarging the dimension of the gate line slit, which may facilitate formation of the gate layer in subsequent processes, avoid the existence of a crack within the gate layer to a certain extent, and improve the reliability of the memory. In another aspect, the dimension of the bottom of the gate line slit may be increased in the process of etching the gate line slit, and the conductive material such as tungsten at the bottom of the gate line slit may be better removed in the subsequent processes, which prevents the bottom of the gate line slit from having residue of the conductive material, which may cause the gate layers to be shorted, and result in leakage.

BRIEF DESCRIPTION OF THE DRAWINGS

Other features, objects, and advantages of the present disclosure will become more apparent from the following detailed description of non-limiting implementations taken in conjunction with the accompanying drawings. In the drawings.

DETAILED DESCRIPTION

For better understanding of the present disclosure, various aspects of the present disclosure will be described in more detail with reference to the accompanying drawings. It should be understood that the detailed description is merely description of exemplary implementations of the present disclosure and is not intended to limit the scope of the present disclosure in any way. Throughout the specification, like reference numerals refer to like elements. The expression "and/or" includes any and all combinations of one or more of the associated listed items.

It should be noted that in this specification, the expressions such as first, second, third, and etc. are used only to distinguish one feature from another feature and do not represent any limitation on the features.

It is also to be understood that the terms "comprising", "including", "having", "containing" and/or "consisting of", when used in this specification, denote the presence of the stated features, elements and/or components, but do not preclude the presence or addition of one or more other features, elements, components and/or combinations thereof. Furthermore, when an expression such as "at least one of . . . " appears before the list of listed features, the expression defines the entire list of features rather than the individual elements in the list. Furthermore, when describing implementations of the present disclosure, the use of "may" means "one or more implementations of the present disclosure". Also, the term "exemplary" is intended to refer to an example or illustration.

Unless otherwise defined, all terms (including technical terms and scientific terms) used herein have the same meaning as that are commonly understood by those ordinarily skilled in the art to which the present disclosure pertains. It is also to be understood that terms, such as terms defined in commonly used dictionaries, should be interpreted as having meanings consistent with their meanings in the context of the related art, and will not be interpreted in idealized or over-formalized forms, unless expressly so defined herein.

It should be noted that the implementations in the present disclosure and the features in the implementations can be combined with each other without contradiction. Hereinafter, the present disclosure will be described in detail with reference to the drawings and in connection with implementations.

Features, principles, and other aspects of the present disclosure are described in detail below.

The etching of the gate line slit is a one-time etching through the memory stack layers, and a gate line slit with a larger top width and a smaller bottom width is generally formed in the etching process. In general, the width of the bottom of the gate line slit is smaller than the width of the top of the gate line slit, which easily results in conductor residue at the bottom of the gate line slit in subsequent processes, resulting in the gate layers being shorted, causing leakage and reducing the reliability of the memory. In addition, since a crack may occur in the deposition of the gate layer, a problem that the gate layer exhibits a high resistance or is disconnected may be caused during the etching back of the gate layer.

Figure 1A:
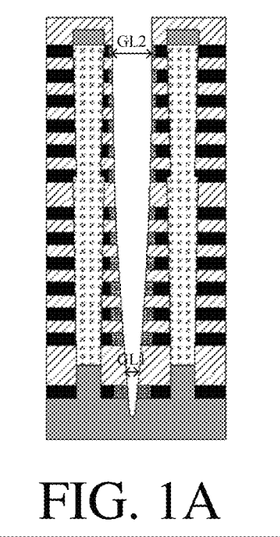
FIG. 1A is a schematic cross-sectional view after a gate line slit is formed on a substrate in some implementations of the disclosure.

In some implementations of the disclosure, after forming the stack structure, etching is performed on the stack structure to form a gate line slit penetrating through the stack structure. As the storage capacity of the memory increases, the thickness of the stack structure increases. The gate line slit is formed generally by one-time etching. Therefore, in the etching process, the dimension of the gate line slit at one side that is away from the substrate is often larger than the dimension of the gate line slit at one side that is close to the substrate. As shown in FIG. 1A, the dimension GL2 of the gate line slit at one side that is away from the substrate is larger than the dimension GL1 of the gate line slit at one side that is close to the substrate, that is, GL2 is larger than GL1.

Figure 1B:
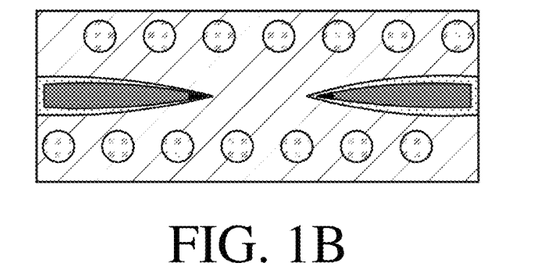
FIG. 1B is a schematic diagram of tungsten residue in a gate line slit in some implementations of the disclosure.
Figure 1C:
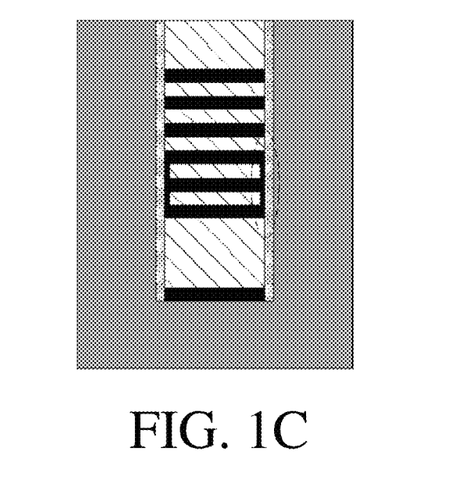
FIG. 1C is a schematic cross-sectional view of a short circuit between gates caused by tungsten residue in some implementations of the disclosure.

A conductive material, such as tungsten, needs to be deposited in the subsequent process of forming the gate layer, and the excess tungsten in the gate line slit is etched. Since the dimension of the gate line slit GL1 is smaller, tungsten residue easily remains at the bottom of the gate line slit when tungsten at the bottom of the gate line slit is removed. As shown in FIGS. 1B and 1C, the tungsten remaining at the bottom of the gate line slit may cause the gate layers to be shorted; as shown inside the dotted line in FIG. 1C, the gate layers are shorted, thereby resulting in leakage of the memory and reducing the reliability of the memory.

Figure 2:
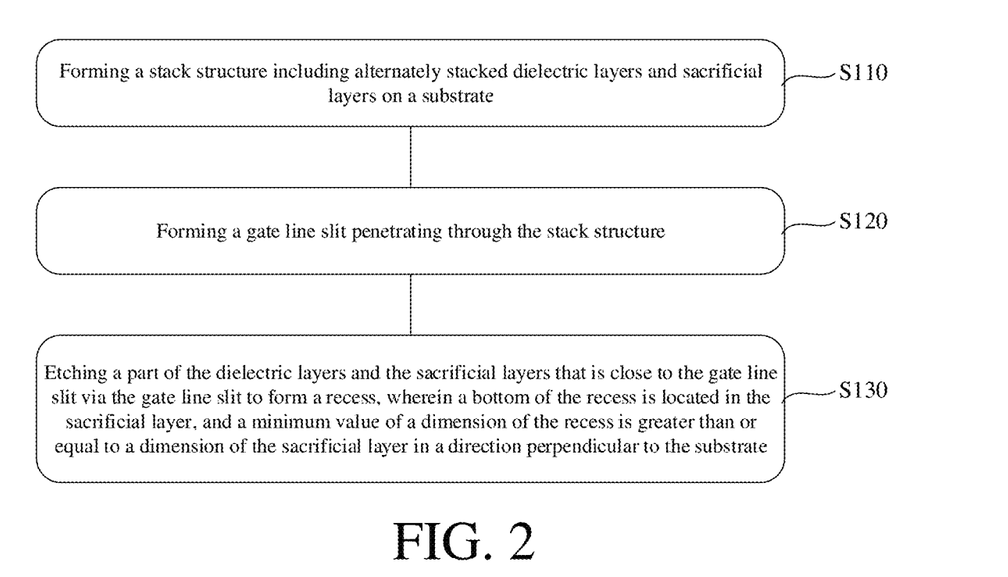
FIG. 2 is a flowchart of a fabrication method of a three-dimensional memory according to an implementation of the present disclosure.

FIG. 2 is a flowchart of a fabrication method 1000 of a three-dimensional memory according to an exemplary implementation of the present disclosure. As shown in FIG. 2, the present disclosure provides a fabrication method 1000 of a three-dimensional memory, comprising: operation S110: forming a stack structure including alternately stacked dielectric layers and sacrificial layers on a substrate; operation S120: forming a gate line slit penetrating through the stack structure; and operation S130: etching a part of the dielectric layers and the sacrificial layers that is close to the gate line slit via the gate line slit to form a recess, wherein a bottom of the recess is located in the sacrificial layer, and the minimum value of the dimension of the recess is greater than or equal to the dimension of the corresponding sacrificial layer in a direction perpendicular to the substrate.

The specific process of each operation of the above-mentioned fabrication method 1000 will be described in detail below with reference to FIGS. 3 to 8.

Figure 3:
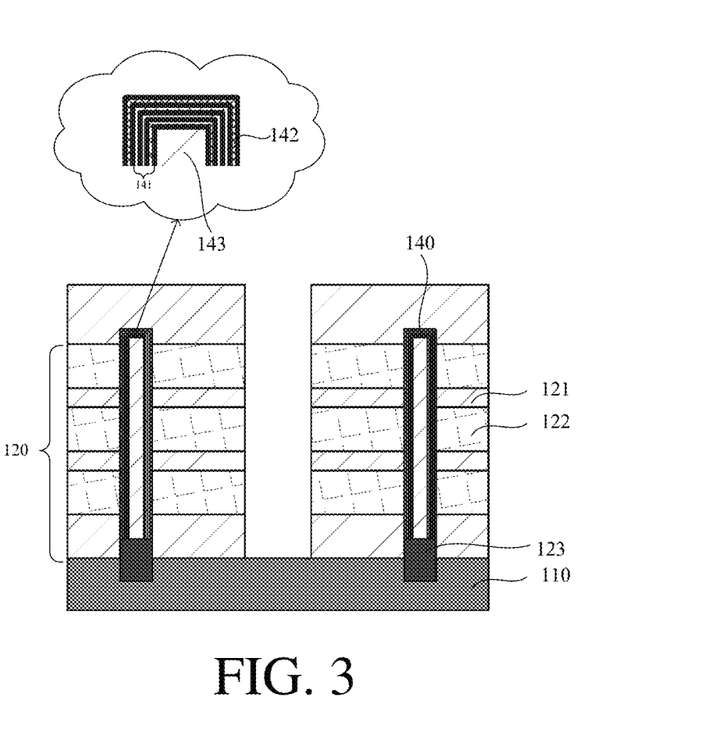
FIG. 3 is a schematic cross-sectional view after forming a channel structure on a substrate according to an implementation of the present disclosure.

FIG. 3 is a schematic cross-sectional view after forming a channel structure on a substrate according to an exemplary implementation of the present disclosure. As shown in FIG. 3, a stack structure 120 is formed on the substrate 110, wherein the stack structure 120 includes alternately stacked dielectric layers 121 and sacrificial layers 122. The substrate 110 may be, for example, a monocrystalline silicon (Si) substrate, a monocrystalline germanium (Ge) substrate, a silicon on insulator (SOI) substrate, or a germanium on insulator (GOI) substrate, etc. The material of the substrate 110 may also be, for example, a compound semiconductor. As an example, the substrate 110 may be a gallium arsenide (GaAs) substrate, an indium phosphide (InP) substrate, a silicon carbide (SiC) substrate, or the like. It is worth noting that the substrate 110 of the present disclosure may be fabricated also using at least one of other semiconductor materials known in the art.

The stack structure 120 may include a plurality of dielectric layers 121 and sacrificial layers 122 alternately stacked in a direction perpendicular to the substrate 110. The method of forming the stack structure 120 may include a thin film deposition process such as chemical vapor deposition (CVD), physical vapor deposition (PVD), atomic layer deposition (ALD), or any combination thereof, which is not limited in the present disclosure. In the stack structure 120, the thicknesses of the plurality of sacrificial layers 122 may be the same or different, the thicknesses of the plurality of dielectric layers 121 may be the same or different, and the thicknesses of the dielectric layers 121 and the sacrificial layers 122 may be set according to specific process requirements. The smaller the thickness of the dielectric layer 121 is, the more favorable for miniaturization of the memory is, but the smaller the thickness of the dielectric layer 121 is, the more easily the dielectric layer 121 is broken down when a high voltage is applied. Illustratively, the ratio of the thicknesses of sacrificial layer 122 to the dielectric layer 121 may be 1 to 1.5.

Moreover, the stack structure 120 may include a plurality of pairs of alternately stacked dielectric layers 121 and sacrificial layers 122. For example, the stack structure 120 may include 64 pairs, 128 pairs, or more than 128 pairs of dielectric layers 121 and sacrificial layers 122. Although the specific number of pairs of dielectric layers 121 and sacrificial layers 122 is illustrated herein, other number of pairs of dielectric layers 121 and sacrificial layers 122 may also be used in other implementations, which is not limited in the present disclosure.

In some implementations, the materials selected for the dielectric layer 121 and the sacrificial layer 122 may have different etch selectivity ratios, and the sacrificial layer 122 may be removed and replaced by a conductive material in the subsequent process so as to form a gate layer, i.e., a word line. Alternatively, the material of the dielectric layer 121 may include, for example, silicon oxide, and the material of the sacrificial layer 122 may include, for example, silicon nitride. The greater the number of the dielectric layers 121 and the sacrificial layers 122 in the stack structure 120 is, the higher the degree of integration is, and the greater the number of memory cells formed therefrom is. The number of stacked layers and the height of the stack structure 120 may be designed according to actual storage requirements, which is not specifically defined in the present disclosure.

As the demand for storage capacity of the three-dimensional memory increases, the number of the memory stacks increases gradually. In order to break through the limitation of traditional process, a dual-stack technology or a multi-stack technology can be adopted in which a stack structure is formed by N (N>2) sub-stack structures sequentially stacked in the direction of the thickness of the stack structure, each sub-stack structure may include a plurality of alternately stacked sacrificial layers 122 and dielectric layers 121, and the number of layers of each sub-stack structure may be the same or different. In the present disclosure, a single stack structure is described as an example, however, it is understood by those skilled in the art that the subsequent fabrication process may be performed on the basis of a multi-stack structure or a single stack structure.

As shown in FIG. 3, in some implementations, a channel hole (not shown) penetrating through the stack structure 120 and extending to the substrate 110 may be formed, and a functional layer 141 and a channel layer 142 may be sequentially formed on an inner wall of the channel hole, and an insulating material is filled in the channel hole 130 to form a channel structure 140. The channel hole (not shown) may be formed in the stack structure 120 by using, for example, a dry or wet etching process. The channel hole may extend vertically towards the substrate 110, thereby exposing part of the substrate 110. The functional layer 141 and the channel layer 142 may be sequentially formed on the sidewall of the channel hole by using a thin film deposition process such as CVD, PVD, ALD, or any combination thereof, as shown in a partially enlarged view of the channel structure in FIG. 3.

In the operation of forming the functional layer 141 and the channel layer 142 on the sidewall of the channel hole, a charge blocking layer, a charge trapping layer and a tunneling layer may be sequentially formed on the sidewall of the channel hole by using a thin film deposition process such as CVD, PVD, ALD, or any combination thereof, wherein the charge blocking layer, the charge trapping layer, and the tunneling layer may be referred to as the functional layer 141. The charge blocking layer serves to block the outflow of charge stored in the charge trapping layer, and the charge trapping layer may pass through the tunneling layer through a tunneling effect under the action of voltage to realize writing and erasing of the memory data. Illustratively, the material of the charge blocking layer may be silicon oxide, the material of the charge trapping layer may be nitride, and the material of the tunneling layer may be oxide.

In the operation of forming the channel layer 142 on the surface of the functional layer 141, the channel layer 142 may be formed on the surface of the functional layer 141 by using a thin film deposition process such as CVD, PVD, ALD, or any combination thereof. The material of the channel layer 142 may be polysilicon. It should be understood that the material of the channel layer 142 is not limited thereto, and other conductive materials may be used.

In the operation of forming an insulating filling layer within the channel hole where the functional layer 141 and the channel layer 142 are formed, a dielectric material such as silicon oxide may be filled within the channel hole by using a thin film deposition process such as CVD, PVD, ALD, or any combination thereof, to form the insulating filling layer 143, thereby forming the channel structure 140. Alternatively, one or more air gaps may be formed to relieve structural stress by controlling the filling process during filling.

In some implementations, an epitaxial layer 123 may also be formed at the bottom of the channel hole, and the epitaxial layer 123 may form an electrical coupling region with the channel layer 142 and the substrate 110. The epitaxial layer 123 may be used in a process of epitaxially growing and forming an epitaxial layer, and the process may include, but is not limited to, vapor phase epitaxy (VPE), liquid phase epitaxy (LPE), molecular beam epitaxy (MBE) or any combination thereof. The material of the epitaxial layer may be at least one of silicon, silicon germanium, germanium, III-V compound materials, II-VI compound materials, organic semiconductor materials, and other suitable semiconductor materials.

Figure 4A:
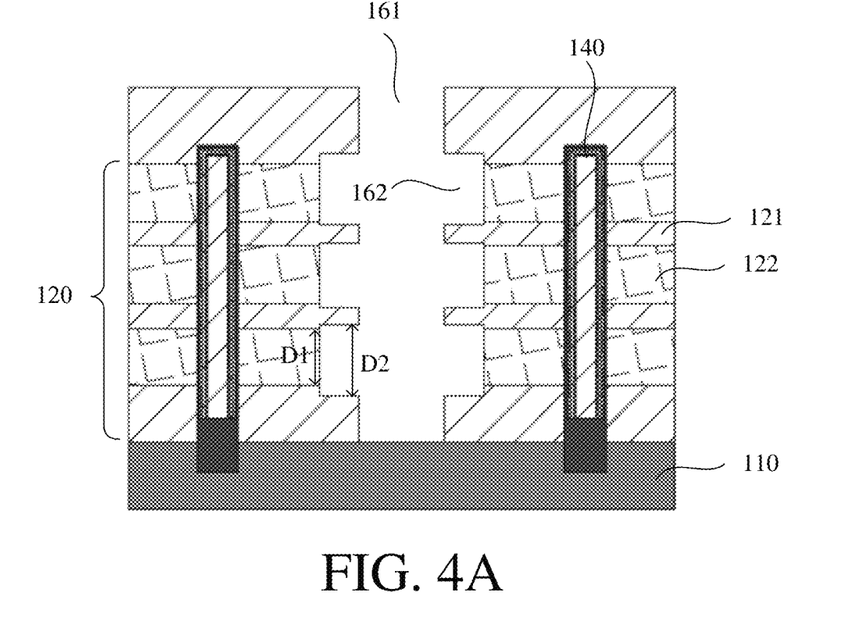
FIG. 4A is a schematic cross-sectional view after forming a recess according to an implementation of the present disclosure.
Figure 4B:
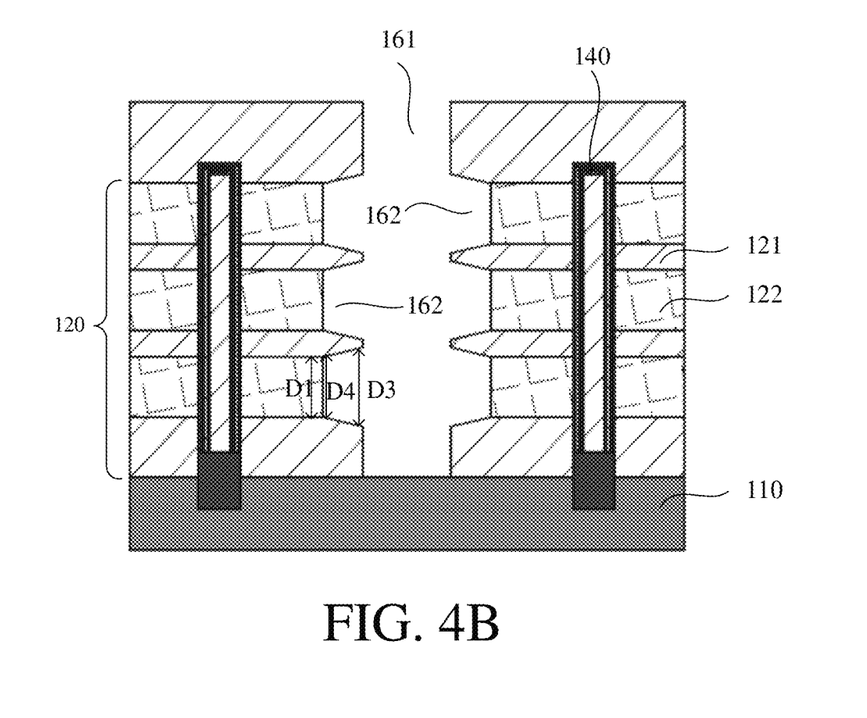
FIG. 4B is a schematic cross-sectional view after forming a recess according to another implementation of the present disclosure.

After the channel structure 140 is formed, a gate line slit may be formed in the subsequent process. FIGS. 4A and 4B are schematic diagrams of a three-dimensional memory after a recess is formed according to an exemplary implementation of the present disclosure. As shown in FIGS. 4A and 4B, a gate line slit 161 penetrating through the stack structure is formed, wherein the gate line slit 161 may be formed by using, for example, a dry or wet etching process. The gate line slit 161 may have a certain spacing distance from the channel structure 140 in a direction parallel to the substrate 110 and penetrate through the stack structure 120.

In an implementation of the present disclosure, the dielectric layer 121 close to the gate line slit 161 and a part of the sacrificial layer 122 are etched based on the gate line slit 161 to form a recess 162. As shown in FIG. 4A, the bottom of the recess 162 is located in the sacrificial layer 122, and the dimension D2 of the recess 162 is larger than the dimension D1 of the corresponding sacrificial layer in a direction perpendicular to the substrate 110. If the recess 162 has a plurality of dimensions, the minimum value of the dimension of the recess 162 is greater than or equal to the dimension D1 of the corresponding sacrificial layer.

In another implementation of the present disclosure, the dielectric layer 121 close to the gate line slit 161 and a part of the sacrificial layer 122 are etched based on the gate line slit 161 to form a recess 162, wherein the bottom of the recess 162 is located in the sacrificial layer 122, and the recess 162 has a tapered dimension in a direction away from the gate line slit 161. As shown in FIG. 4B, the recess 162 is tapered from a dimension D3 close to the gate line slit 161 to a dimension D4 far away from the gate line slit 161. The recess 162 has a plurality of dimensions, the dimension D4 of the recess 162 away from the gate line slit 161 is the smallest, and the minimum value D4 of the dimension of the recess 162 is greater than or equal to the dimension D1 of the corresponding sacrificial layer.

In the above two implementations, an isotropic etching method can be used to etch both the dielectric layer 121 close to the gate line slit 161 and a part of the sacrificial layer 122 to form the recess 162 and at the same time enlarge the dimension of the gate line slit 161, and for example, etching methods such as wet etching and/or gas etching or the like may be used, and wet etching is taken as an example for description in the implementation of the present disclosure. In the implementation of the present disclosure, the etching liquid for wet etching is hydrofluoric acid (HF) and the temperature of the hydrofluoric acid may be 10 to 70 degrees Celsius. The material of the sacrificial layer 122 is silicon nitride (SiN) and the material of the dielectric layer 121 is silicon oxide (SiO2). The hydrofluoric acid has different etching rates for the silicon nitride and the silicon oxide, that is, the hydrofluoric acid has a faster etching rate for the silicon nitride and a slower etching rate for the silicon oxide. Illustratively, the ratio of the etching rate of the silicon nitride to the etching rate of the silicon oxide is n: 1, where 6≤n≤100. Illustratively, the etching time is not more than 30 minutes, and since the hydrofluoric acid has different etching rates for the silicon nitride and the silicon oxide, the recess 162 as shown in FIG. 4A or 4B may be formed. Moreover, those skilled in the art can understand that, hydrofluoric acid is taken as an example for description in the above implementations, a part of the sacrificial layers 122 and a part of the dielectric layers 121 are etched, other isotropic etching liquids or etching gases may also be used for etching, and the present disclosure is not limited thereto.

According to the implementation of the present disclosure, with the different etching rates of the sacrificial layer and the dielectric layer, a recess is formed in the sacrificial layer and part of the dielectric layer, wherein the minimum value of the dimension of the recess is greater than or equal to the dimension of the corresponding sacrificial layer, which is beneficial to the deposition of the gate layer in the subsequent process, avoids the existence of a crack within the gate layer that affects performance of the memory. In another aspect, by means of the etching for forming the recess, the dimension of the gate line slit is enlarged, such that the etching at the bottom of the gate line slit can be made more sufficient.

Figure 4C:
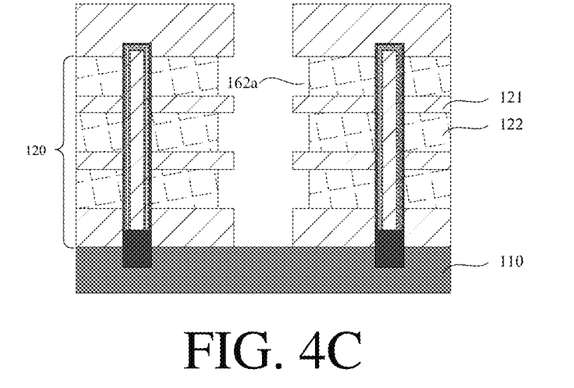
FIG. 4C is a schematic cross-sectional view after forming an initial recess according to an implementation of the present disclosure.

In another implementation of the present disclosure, an initial recess 162a may be formed by separately etching a part of the sacrificial layer 122, and a schematic diagram after forming the initial recess 162a is shown in FIG. 4C. Then, based on the gate line slit 161, the dielectric layer 121 is subjected to isotropic etching to enlarge the initial recess 162a into the recess 162 as shown in FIG. 4A or 4B, and at the same time enlarge the dimension of the gate line slit 161. However, it can be understood by those skilled in the art that the above-described manner of forming the recess is exemplary and the present disclosure is not limited thereto.

According to the implementation of the present disclosure, by etching the sacrificial layer first and then the dielectric layer, a recess is formed in the sacrificial layer and part of the dielectric layers, wherein the minimum value of the dimension of the recess is greater than or equal to the dimension of the corresponding sacrificial layer, which is beneficial to the deposition of the gate layer in the subsequent process, avoids the existence of a crack within the gate layer that affects performance of the memory. In another aspect, by means of the etching for forming the recess, the dimension of the gate line slit is enlarged, such that the etching at the bottom of the gate line slit can be made more sufficient.

Figure 5:
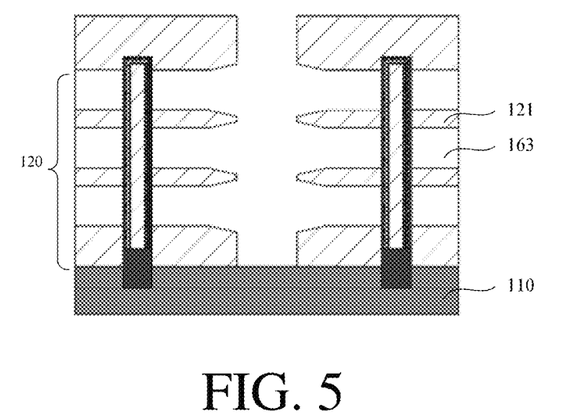
FIG. 5 is a schematic cross-sectional view after forming a gate gap according to an implementation of the present disclosure.
Figure 6:
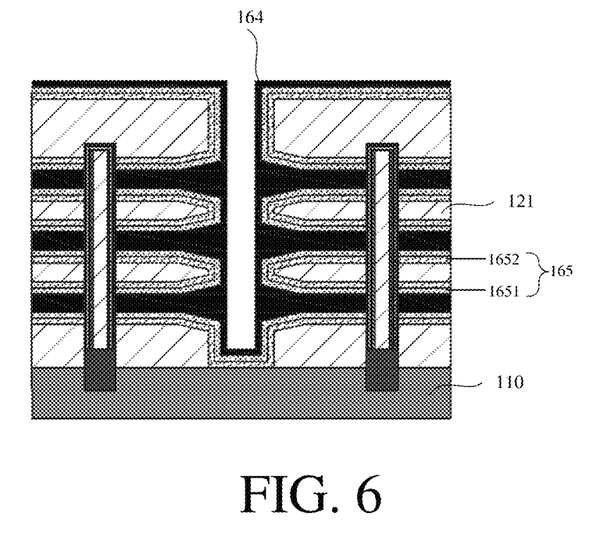
FIG. 6 is a schematic cross-sectional view after forming a filling layer according to an implementation of the present disclosure.
Figure 7:
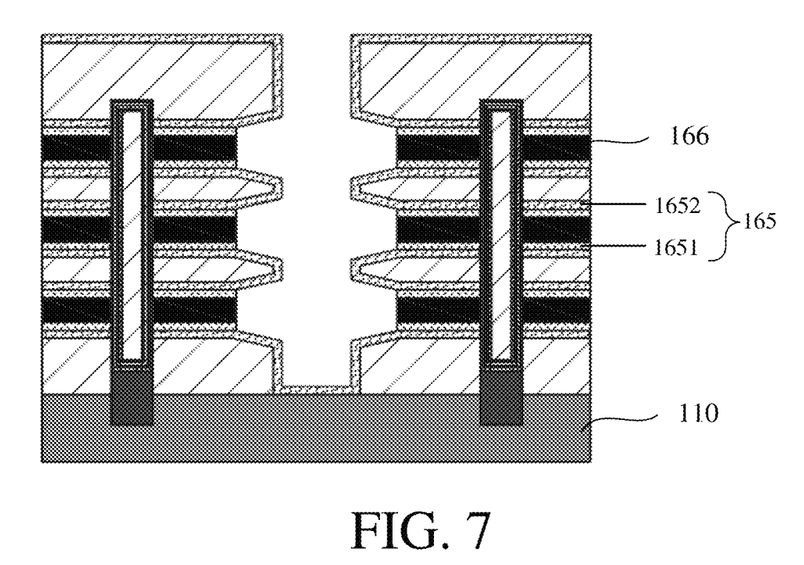
FIG. 7 is a schematic cross-sectional view after forming a gate layer according to an implementation of the present disclosure.
Figure 8A:
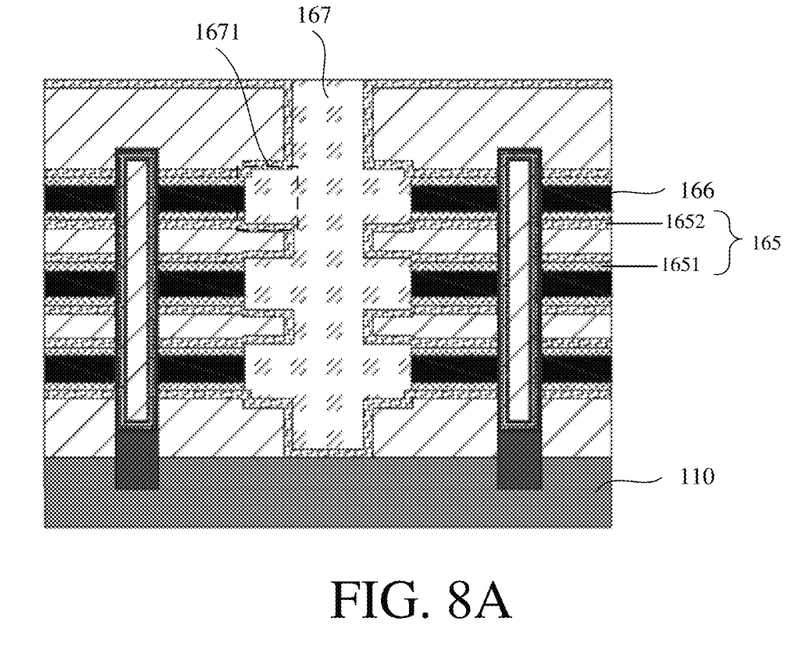
FIG. 8A is a schematic cross-sectional view after forming a filling layer according to an implementation of the present disclosure.
Figure 8B:
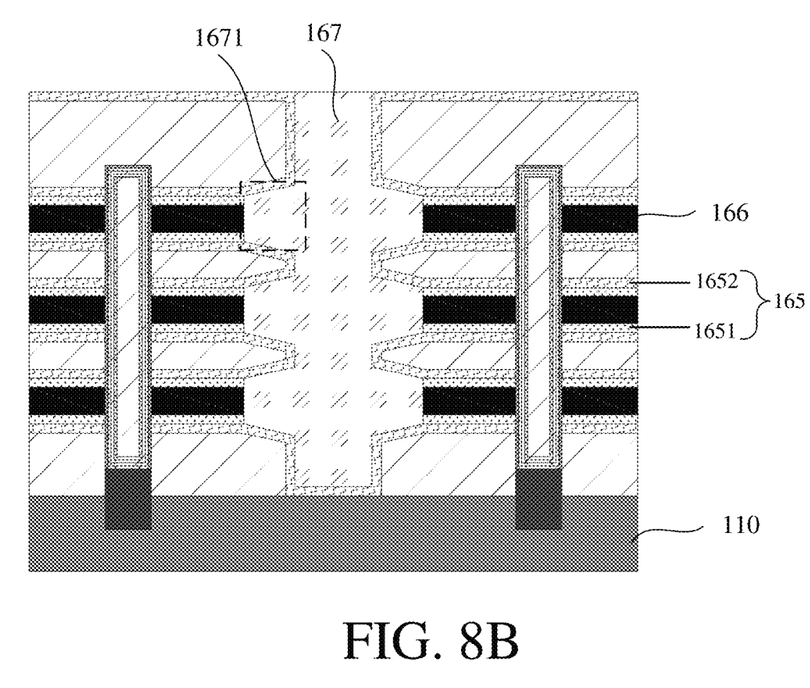
FIG. 8B is a schematic cross-sectional view after forming a filling layer according to another implementation of the present disclosure.

After the recess 162 is formed, the remaining sacrificial layer 122 in the stack structure 120 may be removed by, for example, etching, to form a gate gap 163. The schematic diagram of construction of the semiconductor component after the gate gap 163 is formed is shown in FIG. 5. A conductive material is then deposited via the gate line slit 161 to form a conductive layer 164 within the gate gap 163, within the recess 162, on the sidewall of the gate line slit 161, and on the surface of the stack structure at one side away from the substrate, wherein the material of the conductive layer 164 may be, for example, tungsten, cobalt, copper, aluminum, or doped crystalline silicon. Prior to the operation of forming the conductive layer 164, an insulating layer 165 may be formed on the sidewall of the gate line slit 161, the inner wall of the recess 162 and the inner wall of the gate gap by using a thin film deposition process such as CVD, PVD, ALD, or any combination thereof, wherein the insulating layer 165 may include a blocking layer 1652 and an adhesive layer 1651. The material of the blocking layer 1652 may be fabricated by, for example, a high dielectric constant material such as aluminum oxide or hafnium oxide. The material of the adhesive layer 1651 may be fabricated by, for example, tantalum nitride or titanium nitride. The adhesive layer 1651 helps to increase an adhesive force between the blocking layer 1652 and the gate that is formed in the subsequent process. In the subsequent process, an etching process may also be used to remove the conductive layer on the sidewall of the gate line slit 161 and on the inner wall of the recess 162 to form a gate layer 166, and to remove the adhesive layer 1651 on the sidewall of the gate line slit and on the inner wall of the recess 162 to form a semiconductor structure as shown in FIG. 7. An insulating material such as polysilicon, silicon carbide, silicon oxide, or the like may then be filled in the gate line slit 161 and the recess 162 by using the thin film deposition process to form a filling layer 167 having a protruding portion 1671, as shown in FIG. 8A or 8B.

According to the implementations of the present disclosure, the existence of a crack within the gate layer is avoided to a certain extent, and the reliability of the memory is improved. In another aspect, by adding a recess, the dimension of the bottom of the gate line slit can be increased in the process of etching the gate line slit, and the conductive material, such as tungsten, cobalt, copper, aluminum or doped crystalline silicon, at the bottom of the gate line slit can be better removed in the subsequent processes, so as to prevent the bottom of the gate line slit from having residue of the conductive material, which may cause the gate layers to be shorted and result in leakage, and to improve the reliability of the memory to a certain extent.

Another aspect of the present disclosure further provides a three-dimensional memory structure, and as shown in FIG. 8, the three-dimensional memory structure may comprise: a substrate; a stack structure on the substrate and including alternately stacked dielectric layers and gate layers; and a gate line slit structure including a central portion penetrating through the stack structure and a plurality of protruding portions protruding laterally outward from the central portion, a protruding end of the protruding portion being in contact with the gate layer, and a minimum value of a dimension of the protruding portion being greater than or equal to the dimension of the corresponding gate layer. In an implementation of the present disclosure, the process of forming the gate line slit structure may include: as shown in FIG. 4, the dielectric layer 121 close to the gate line slit 161 and a part of the sacrificial layer 122 are etched based on the gate line slit 161 to form the recess 162, wherein the bottom of the recess 162 is located in the sacrificial layer 122. As shown in FIG. 4A, the dimension D2 of the recess is larger than the dimension D1 of the corresponding sacrificial layer in a direction perpendicular to the substrate 110. In another implementation of the present disclosure, the recess 162 has a tapered dimension in a direction away from the gate line slit 161. As shown in FIG. 4B, the recess 162 is tapered from a dimension D3 close to the gate line slit 161 to a dimension D4 far away from the gate line slit 161.

In the above two implementations, an isotropic etching method may be used to etch both the dielectric layer 121 close to the gate line slit 161 and a part of the sacrificial layer 122 to form the recess 162 and at the same time enlarge the dimension of the gate line slit 161, and for example, etching methods such as wet etching and/or gas etching or the like may be used, and wet etching is taken as an example for description in the implementation of the present disclosure. In the implementation of the present disclosure, the etching liquid for wet etching is hydrofluoric acid (HF) and the temperature of the hydrofluoric acid may be 10 to 70 degrees Celsius. The material of the sacrificial layer 122 is silicon nitride (SiN) and the material of the dielectric layer 121 is silicon oxide ($SiO_2$). The hydrofluoric acid has different etching rates for the silicon nitride and the silicon oxide, that is, the hydrofluoric acid has a faster etching rate for the silicon nitride and a slower etching rate for the silicon oxide. Illustratively, the ratio of the etching rate of the silicon nitride to the etching rate of the silicon oxide is n: 1, where $6 \leq n \leq 100$. Illustratively, the etching time is not more than 30 minutes, and since the hydrofluoric acid has different etching rates for the silicon nitride and the silicon oxide, the recess 162 as shown in FIG. 4A or 4B may be formed. Moreover, those skilled in the art can understand that, hydrofluoric acid is taken as an example for description in the above implementations, a part of the sacrificial layers 122 and a part of the dielectric layers 121 are etched, other isotropic etching liquids or etching gases may also be used for etching, and the present disclosure is not limited thereto.

According to the implementation of the present disclosure, with the different etching rates of the sacrificial layer and the dielectric layer, a recess is formed in the sacrificial layer and part of the dielectric layer, wherein the minimum value of the dimension of the recess is greater than or equal to the dimension of the corresponding sacrificial layer, which is beneficial to the deposition of the gate layer in the subsequent process, avoids the existence of a crack within the gate layer that affects performance of the memory. In another aspect, by means of the etching for forming the recess, the dimension of the gate line slit is enlarged, such that the etching at the bottom of the gate line slit can be made more sufficient.

In another implementation of the present disclosure, an initial recess 162a may be formed by separately etching a part of the sacrificial layer 122, and a schematic diagram after forming the initial recess 162a is shown in FIG. 4B. Then, based on the gate line slit 161, the dielectric layer 121 is subjected to isotropic etching to enlarge the initial recess 162a into the recess 162 as shown in FIG. 4A or 4B, and at the same time enlarge the dimension of the gate line slit 161.

According to the implementation of the present disclosure, by etching the sacrificial layer first and then the dielectric layer, a recess is formed in the sacrificial layers and part of the dielectric layers, wherein the minimum value of the dimension of the recess is greater than or equal to the dimension of the corresponding sacrificial layer, which is beneficial to the deposition of the gate layer in the subsequent process, avoids the existence of a crack within the gate layer that affects performance of the memory. In another aspect, by means of the etching for forming the recess, the dimension of the gate line slit is enlarged, such that the etching at the bottom of the gate line slit can be made more sufficient.

After the recess 162 is formed, the remaining sacrificial layer 122 in the stack structure 120 may be removed by, for example, etching, to form a gate gap 163. The schematic diagram of construction of the semiconductor component after the gate gap 163 is formed is shown in FIG. 5. A conductive material is then deposited via the gate line slit 161 to form a conductive layer 164 within the gate gap 163, within the recess 162, on the sidewall of the gate line slit 161, and on the surface of the stack structure at one side away from the substrate, wherein the material of the conductive layer 164 may be, for example, tungsten, cobalt, copper, aluminum, or doped crystalline silicon. Prior to the operation of forming the conductive layer 164, an insulating layer 165 may be formed on the sidewall of the gate line slit 161, the inner wall of the recess 162 and the inner wall of the gate gap by using a thin film deposition process such as CVD, PVD, ALD, or any combination thereof, wherein the insulating layer 165 may include a blocking layer 1652 and an adhesive layer 1651. The material of the blocking layer 1652 may be fabricated by, for example, a high dielectric constant material such as aluminum oxide or hafnium oxide. The material of the adhesive layer 1651 may be fabricated by, for example, tantalum nitride or titanium nitride. The adhesive layer 1651 helps to increase an adhesive force between the blocking layer 1652 and the gate that is formed in the subsequent process. In the subsequent process, an etching process may also be used to remove the conductive layer on the sidewall of the gate line slit 161 and on the inner wall of the recess 162 to form a gate layer 166, and to remove the adhesive layer 1651 on the sidewall of the gate line slit 161 and on the inner wall of the recess 162 to form a semiconductor structure as shown in FIG. 7. An insulating material such as polysilicon, silicon carbide, silicon oxide, or the like may then be filled in the gate line slit 161 and the recess 162 by using the thin film deposition process to form a filling layer 167. The gate line slit structure may include a central portion composed of a filling layer 167 within the gate line slit and a protruding portion 1671 composed of a filling layer within the recess 162, wherein a protruding end of the protruding portion 1671 is in contact with the gate layer. In one implementation of the present disclosure, the minimum value of the dimension of the protruding portion 1671 is greater than or equal to the dimension of the corresponding gate layer 166, as shown in FIG. 8A. In another implementation of the present disclosure, the protruding portion 1671 has a tapered dimension in a direction away from the central portion, as shown in FIG. 8B.

According to the implementations of the present disclosure, by forming the above three-dimensional memory structure, the existence of a crack within the gate layer is avoided to a certain extent, and the reliability of the memory is improved. In another aspect, the increase of the dimension of the bottom of the gate line slit prevents the bottom of the gate line slit from having residue of the conductive material, which may cause the gate layers to be shorted and result in leakage, and improves the reliability of the memory to a certain extent.

Since the contents and structures involved in the above description of the fabrication method 1000 may be fully or partially applicable to the three-dimensional memory structure described herein, the contents related to or similar to the above mentioned contents are not described in detail.

The foregoing description is only a preferred implementation of the present disclosure and is merely illustrative of the technical principles employed. It should be understood by those skilled in the art that the inventive scope involved in the present disclosure is not limited to the technical solution resulting from a particular combination of the above technical features, but should also cover other technical solutions formed by any combination of the above technical features or equivalent features thereof without departing from the inventive concept, such as the technical solutions formed by replacing the above-mentioned features and the technical features having similar functions (but not limited to) disclosed in the present disclosure with each other.

What is claimed is:

1. A method for forming a three-dimensional memory, comprising:
    forming a stack structure comprising alternately stacked dielectric layers and sacrificial layers;
    forming a gate line slit penetrating vertically penetrating the stack structure and extending in a first horizontal direction; and
    etching portions of the dielectric layers and the sacrificial layers adjacent to the gate line slit to form a plurality of recesses, wherein an aperture of each recess in a vertical direction is greater than a thickness of a corresponding sacrificial layer;
    wherein etching portions of the dielectric layers and the sacrificial layers comprises performing an isotropic etching on the dielectric layers and the sacrificial layers simultaneously to form the plurality of recesses and enlarge the gate line slit, and a ratio of the first etching rate of the sacrificial layers to a second etching rate of the dielectric layers is in a range from about 6 to about 100.

2. The method of claim 1, wherein a cross section of each recess in a second horizontal direction perpendicular to the first horizontal direction has a tapered shape.

3. The method of claim 1, wherein etching portions of the dielectric layers and the sacrificial layers comprises:
    etching portions of the sacrificial layers adjacent to the gate line slit to form a plurality of initial recesses; and
    performing an isotropic etching on the dielectric layers to enlarge the gate line slit and enlarge the plurality of initial recesses to form the plurality of recesses.

4. The method of claim 1, wherein the isotropic etching comprises a gas etching.

5. The method of claim 1, wherein:
    the isotropic etching comprises a wet etching;
    an etching liquid for the wet etching includes hydrofluoric acid; and
    a temperature of the hydrofluoric acid is about 10 degrees Celsius to about 70 degrees Celsius.

6. The method of claim 5, wherein a time during of the wet etching is less than 30 minutes.

7. The method of claim 1, further comprising:
    removing remaining portions of the sacrificial layers to form a plurality of gate gaps; and
    filling a conductive material within the plurality of gate gaps to form a plurality of gate layers.

8. The method of claim 7, wherein form the plurality of gate layers comprises:
    forming a conductive structure in the plurality of gate gaps, in the plurality of recesses, and on sidewalls of the gate line slit; and
    removing portions of the conductive structure in the plurality of recesses and on the sidewalls of the gate line slit, such that remaining portions of the conductive structure in the plurality of gate gaps form the plurality of gate layers.

9. The method of claim 8, further comprising:
before forming the conductive structure, forming an insulating layer on sidewalls of the gate line slit, and inner walls of the plurality of recesses and the plurality of gate gaps.

10. The method of claim 9, wherein forming the insulating layer comprises:
forming a blocking layer to cover exposed surfaces of the dielectric layers exposed by the gate line slit, the plurality of recesses, and the plurality of gate gaps; and
forming an adhesive layer to cover the blocking layer.

11. The method of claim 10, wherein:
forming the blocking layer comprises depositing a high dielectric constant material; and
forming the adhesive layer comprises depositing a nitride material.

12. The method of claim 11, further comprising:
after removing portions of the conductive structure, removing portions of the adhesive layer that are on the sidewalls of the gate line slit, and on the inner walls of the plurality of recesses.

13. The method of claim 7, wherein the conductive material comprises tungsten.

14. The method of claim 1, further comprising:
before forming the gate line slit, forming a plurality of channel structures vertically penetrating the stack structure;
wherein the gate line slit is formed to separate the plurality of channel structures.

15. A three-dimensional memory device, comprising:
a stack structure including alternately stacked dielectric layers and gate layers; and
a gate line slit structure extending in a first horizontal direction in the stack structure, comprising:
a main insulating portion penetrating through the stack structure in a vertical direction, and
a plurality of protruding insulating portions protruding outward from the main insulating portion along a second horizontal direction perpendicular to the first horizontal direction, wherein each protruding insulating portion has an end in contact with a corresponding gate layer, and an average thickness of at least one protruding insulating portion in the vertical direction is greater than a thickness of at least one corresponding gate layer.

16. The memory device of claim 15, wherein a cross section of each protruding insulating portion in the second horizontal direction has a tapered shape.

17. The memory device of claim 15, wherein a thickness of the end of each protruding insulating portion in contacting with the corresponding gate layer is a minimum thickness of the protruding insulating portion in the vertical direction.

18. The memory device of claim 15, further comprising:
a block layer between the gate line slit structure and the dielectric layers, and between the gate layers and the dielectric layers; and
an adhesive layer between the gate layers and the block layer.

19. The memory device of claim 18, wherein:
each protruding insulating portion is separated from the dielectric layers by non-horizontal portions of the blocking layer, and is contact with ends of adjacent adhesive layers that sandwich the corresponding gate layer.

20. The memory device of claim 15, wherein a first thickness of an end of the at least one protruding insulating portion in contacting with the at least one corresponding gate layer is less than a second thickness of the at least one protruding insulating portion in contacting with the main insulating portion.

* * * * *